(12) United States Patent
Frolova et al.

(10) Patent No.: US 12,511,912 B2
(45) Date of Patent: Dec. 30, 2025

(54) OBJECT DETECTION AND TRACKING

(71) Applicant: HUAWEI TECHNOLOGIES CO., LTD., Shenzhen (CN)

(72) Inventors: Darya Frolova, Hod Hasharon (IL); Shahar Ben Ezra, Hod Hasharon (IL); Pavel Kisilev, Hod Hasharon (IL); Xiaoli She, Shenzhen (CN); Yu Xie, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 289 days.

(21) Appl. No.: 18/187,508

(22) Filed: Mar. 21, 2023

(65) Prior Publication Data

US 2023/0237811 A1 Jul. 27, 2023

Related U.S. Application Data

(63) Continuation of application No. PCT/CN2020/116762, filed on Sep. 22, 2020.

(51) Int. Cl.
*G06V 20/58* (2022.01)
*G06T 5/70* (2024.01)
*G06V 10/82* (2022.01)
*G06V 20/56* (2022.01)

(52) U.S. Cl.
CPC .............. *G06V 20/58* (2022.01); *G06T 5/70* (2024.01); *G06V 10/82* (2022.01); *G06V 20/588* (2022.01); *G06V 2201/07* (2022.01)

(58) Field of Classification Search
CPC ...... G06V 20/58; G06V 20/588; G06V 10/82; G06V 10/454; G06V 2201/07; G06T 5/70; G06N 3/045; G06N 3/08
See application file for complete search history.

(56) References Cited

U.S. PATENT DOCUMENTS

| | | |
|---|---|---|
| 8,335,350 B2 | 12/2012 | Wu |
| 8,358,808 B2 | 1/2013 | Malinovskiy et al. |
| 8,384,787 B2 | 2/2013 | Wu |
| 8,538,082 B2 | 9/2013 | Zhao et al. |
| 9,672,430 B2 | 6/2017 | Sull et al. |
| 2013/0051612 A1* | 2/2013 | Prokhorov ............. G06V 20/49 382/103 |

(Continued)

FOREIGN PATENT DOCUMENTS

WO    WO-2019137912 A1 *  7/2019

OTHER PUBLICATIONS

Tran et al, Learning Spatiotemporal Features with 3D Convolutional Networks, 2015, IEEE International Conference on Computer Vision, pp. 1-10. (Year: 2015).*

(Continued)

*Primary Examiner* — Kathleen M Broughton
(74) *Attorney, Agent, or Firm* — Leydig, Voit & Mayer, Ltd.

(57) ABSTRACT

A method and a computing device for object detection and tracking from a video input are described. The method and the computing device may be used to, for example, track objects of interest, such as lane markings, in traffic. A plurality of frames corresponding to a video may be analyzed in a spatiotemporal domain by a neural network. The neural network may be trained using data synthesized in the spatiotemporal domain.

20 Claims, 7 Drawing Sheets

(56) References Cited

U.S. PATENT DOCUMENTS

| | | | |
|---|---|---|---|
| 2016/0254024 A1* | 9/2016 | Wu | G11B 27/031 386/278 |
| 2016/0379055 A1 | 12/2016 | Loui et al. | |
| 2020/0394412 A1* | 12/2020 | Carreira | G06V 10/454 |
| 2021/0357647 A1* | 11/2021 | Na | G06N 3/045 |

OTHER PUBLICATIONS

Le et al, Video Salient Object Detection using Spatiotemporal Deep Features, 2018, arXiv:1708.01447v3, pp. 1-14. (Year: 2018).*
Rapantzikos et al, Spatiotemporal visual attention architecture for video analysis, 2004, IEEE 6th Workshop on Multimedia Signal Processing, pp. 1-5. (Year: 2005).*
Wan et al, Action Recognition Based on Two-Stream Convolutional Networks, 2020, IEEE Digital Object Identifier, 8 (2020): 85284-85293. (Year: 2020).*
Aslan et al., "Deep Convolutional Generative Adversarial Networks Based Flame Detection in Video," arxiv.org, Cornell University Library, 201 Olin Library Cornell University Ithaca, NY 14853, XP081025665, total 5 pages (Feb. 5, 2019).
Borkar et al., "An Efficient Method to Generate Ground Truth for Evaluating Lane Detection Systems," 2010 IEEE International Conference on Acoustics, Speech and Signal Processing, Dallas, TX, USA, IEEE—Institute of Electrical and Electronics Engineers, New York, New York, pp. 1090-1093 (Mar. 14-19, 2010).
Borkar et al., "A Novel Lane Detection System With Efficient Ground Truth Generation," IEEE Transactions on Intelligent Transportation Systems, vol. 13, No. 1, Mar. 2012, XP011427541, pp. 365-374, IEEE—Institute of Electrical and Electronics Engineers, New York, New York (Mar. 2012).
Jung et al., "Efficient Lane Detection Based on Spatiotemporal Images," in IEEE Transactions on Intelligent Transportation Systems, vol. 17, No. 1, pp. 1-7, IEEE—Institute of Electrical and Electronics Engineers, New York, New York (Jan. 2016).
Das et al., "Enhanced Algorithm of Automated Ground Truth Generation and Validation for Lane Detection System by M2BMT," in IEEE Transactions on Intelligent Transportation Systems, vol. 18, No. 4, pp. 1-10, IEEE—Institute of Electrical and Electronics Engineers, New York, New York (Apr. 2017).
Garnett et al., "3D-LaneNet: End-to-End 3D Multiple Lane Detection," arXiv: 1811.10203v3, total 14 pages, (Sep. 10, 2019).
Behrendt et al., "Deep Learning Lane Marker Segmentation From Automatically Generated Labels," 2017 IEEE/RSJ International Conference on Intelligent Robots and Systems (IROS), Vancouver, BC, Canada, pp. 777-782, IEEE—Institute of Electrical and Electronics Engineers, New York, New York (Sep. 24-28, 2017).
Behrendt et al., "Unsupervised Labeled Lane Markers Using Maps," 2019 IEEE/CVF International Conference on Computer Vision Workshop (ICCVW), pp. 832-839, IEEE—Institute of Electrical and Electronics Engineers, New York, New York (Oct. 27-28, 2019).
Sarraf et al., "Ground Truth and Performance Evaluation of Lane Border Detection," International Conference on Computer Vision and Graphics, pp. 1-8 (Sep. 15, 2014).
Zou et al., "Robust Lane Detection from Continuous Driving Scenes Using Deep Neural Networks," IEEE Transactions on Vehicular Technology, pp. 1-15, IEEE—Institute of Electrical and Electronics Engineers, New York, New York (Oct. 25, 2019).
Tapia-Espinoza et al., "Robust Lane Sensing and Departure Warning under Shadows and Occlusions," Sensors 2013, vol. 13, doi:10.3390/s130303270, ISSN 1424-8220, pp. 3270-3298 (Mar. 11, 2013).
Nowruzi et al., "How much real data do we actually need: Analyzing object detection performance using synthetic and real data," ICML Workshop on AI for Autonomous Driving, total 11 pages (Jul. 16, 2019).
Neven et al., "Towards End-to-End Lane Detection: an Instance Segmentation Approach," CVPR, total 7 pages (Feb. 15, 2018).
Pan et al., "Spatial as Deep: Spatial CNN for Traffic Scene Understanding," arXiv:1712.06080v1, total 8 pages (Dec. 17, 2017).
Hou et al., "Learning Lightweight Lane Detection CNNs by Self Attention Distillation," ICCV, total 11 pages (Aug. 2, 2019).
Ko et al., "Key Points Estimation and Point Instance Segmentation Approach for Lane Detection," arXiv:2002.06604v4, pp. 1-10 (Sep. 14, 2020).
Rav-Acha et al., "Spatio-Temporal Video Warping," SIGGRAPH '05: ACM SIGGRAPH 2005 Sketches, total 1 page (Jul. 31, 2005).

* cited by examiner

OBJECT DETECTION AND TRACKING

CROSS-REFERENCE TO RELATED APPLICATIONS

This application is a continuation of International Application No. PCT/CN2020/116762, filed on Sep. 22, 2020, the contents and disclosure of which are hereby expressly incorporated herein by reference in their entirety.

TECHNICAL FIELD

The disclosure relates to a method, and more particularly to a method for object detection and tracking from a video input. Furthermore, the disclosure relates to corresponding computing device and a computer program.

BACKGROUND

The increased popularity of smart driving assistance systems in modern vehicles brings forward many computer vision tasks such as lane detection, road segmentation, object detection, and object tracking. These tasks require fast, efficient, and robust solutions.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a device and a method for object detection and tracking from a video input. The object is achieved by the features of the independent claims. Further implementation forms are provided in the dependent claims, the description and the figures.

According to a first aspect, a method comprises: obtaining a plurality of frames corresponding to a video, wherein the plurality of frames comprises features of interest; forming, based on the plurality of frames, a spatiotemporal data volume, wherein two dimensions of the spatiotemporal data volume correspond to spatial dimensions of the plurality of frames and one dimension of the spatiotemporal data volume corresponds to a temporal dimension of the plurality of frames; slicing the spatiotemporal data volume along a plurality of surfaces, producing a plurality of spatiotemporal images, wherein each spatiotemporal image in the plurality of spatiotemporal images corresponds to the spatiotemporal data volume along a corresponding surface in the plurality of surfaces; and enhancing the features of interest in the plurality of spatiotemporal images using a neural network, producing a processed plurality of spatiotemporal images. The method may enable, for example, efficiently enhancing the features of interest. Since the neural network can analyze the features of interest in the spatiotemporal domain, the neural network may have a simpler structure and be computationally more efficient.

In an implementation form of the first aspect, the obtaining the plurality of frames comprises: obtaining a plurality of input frames corresponding to the video; and performing feature extraction on the plurality of input frames, producing the plurality of frames and the features of interest in the plurality of frames. The method may enable, for example, extracting the features of interest with, for example, an appropriate and efficient algorithm and then enhancing the features of interest using the neural network.

In a further implementation form of the first aspect, the enhancing the features of interest in the plurality of spatiotemporal images comprises at least one of: removing noise from the plurality of spatiotemporal images; connecting disconnected parts of at least one geometrical shape in the plurality of spatiotemporal images; extracting at least one geometrical shape in the plurality of spatiotemporal images; or classifying at least one geometrical shape in the plurality of spatiotemporal images; wherein the at least one geometrical shape corresponds to a feature of interest in the features of interest. The method may enable, for example, enhancing the features of interest more efficiently, since the features of interest can correspond to simpler geometrical shapes in the spatiotemporal domain.

In a further implementation form of the first aspect, the method further comprises projecting the enhanced features of interest in the processed plurality of spatiotemporal images onto the plurality of input frames or onto the plurality of frames. The method may enable, for example, projecting the enhanced features of interest, such as lane markings, back onto images of traffic in driving assistance applications. Thus, the enhanced features of interest may be, for example, illustrated visually to a user.

In a further implementation form of the first aspect, the features of interest correspond to objects of interest in traffic. The method may enable, for example, enhancing features of interest corresponding to objects of interest in traffic.

In a further implementation form of the first aspect, the objects of interest in traffic comprise at least one of: a lane marking; a segment of road; or an object in traffic to be tracked. The method may enable, for example, flexibly enhancing various different features of interest corresponding to objects of interest in traffic.

In a further implementation form of the first aspect, the neural network comprises a convolutional neural network. The method may enable, for example, efficiently enhancing the features of interest.

In a further implementation form of the first aspect, the neural network is configured to be trained using synthesized spatiotemporal images comprising synthesized features of interest. Since the neural network can enhance the features of interest in the spatiotemporal domain, the neural network can also be trained in the spatiotemporal domain. It may be easier to synthesize realistic training data in the spatiotemporal domain than to, for example, synthesize realistic images of traffic.

According to a second aspect, a computer program comprises program code configured to perform the method according to the first aspect when the computer program is executed on a computer.

According to a third aspect, a computing device is configured to: obtain a plurality of frames corresponding to a video, wherein the plurality of frames comprises features of interest; form, based on the plurality of frames, a spatiotemporal data volume, wherein two dimensions of the spatiotemporal data volume correspond to spatial dimensions of the plurality of frames and one dimension of the spatiotemporal data volume corresponds to a temporal dimension of the plurality of frames; slice the spatiotemporal data volume along a plurality of surfaces, producing a plurality of spatiotemporal images, wherein each spatiotemporal image in the plurality of spatiotemporal images corresponds to the spatiotemporal data volume along a corresponding surface in the plurality of surfaces; and enhance the features of interest in the plurality of spatiotemporal images using a neural network, producing a processed plurality of spatiotemporal images. The computing device may, for example, efficiently enhance the features of interest. Since the neural network can analyze the features of interest in the spatiotemporal domain, the neural network may have a simpler structure and be computationally more efficient.

In an implementation form of the third aspect, the computing device is further configured to obtain the plurality of frames by performing: obtain a plurality of input frames corresponding to the video; and perform feature extraction on the plurality of input frames, producing the plurality of frames and the features of interest in the plurality of frames. The computing device may, for example, extract the features of interest with, for example, an appropriate and efficient algorithm and then enhance the features of interest using the neural network.

In a further implementation form of the third aspect, the computing device is further configured to enhance the features of interest in the plurality of spatiotemporal images by performing at least one of: remove noise from the plurality of spatiotemporal images; connect disconnected parts of at least one geometrical shape in the plurality of spatiotemporal images; extract at least one geometrical shape in the plurality of spatiotemporal images; or classify at least one geometrical shape in the plurality of spatiotemporal images; wherein the at least one geometrical shape corresponds to a feature of interest in the features of interest. The computing device may, for example, enhance the features of interest more efficiently, since the features of interest can correspond to simpler geometrical shapes in the spatiotemporal domain.

In a further implementation form of the third aspect, the computing device is further configured to: project the enhanced features of interest in the processed plurality of spatiotemporal images onto the plurality of input frames or onto the plurality of frames. The computing device may, for example, project the enhanced features of interest, such as lane markings, back onto images of traffic in driving assistance applications. Thus, the enhanced features of interest may be, for example, illustrated visually to a user.

In a further implementation form of the third aspect, the features of interest correspond to objects of interest in traffic. The computing device may, for example, enhance features of interest corresponding to objects of interest in traffic.

In a further implementation form of the third aspect, the objects of interest in traffic comprise at least one of: a lane marking; a segment of road; or an object in traffic to be tracked. The computing device may, for example, flexibly enhance various different features of interest corresponding to objects of interest in traffic.

In a further implementation form of the third aspect, the neural network comprises a convolutional neural network. The computing device may, for example, efficiently enhance the features of interest.

In a further implementation form of the third aspect, the neural network has been trained using synthesized spatiotemporal images comprising synthesized features of interest. Since the neural network can enhance the features of interest in the spatiotemporal domain, the neural network can also be trained in the spatiotemporal domain. It may be easier to synthesize realistic training data in the spatiotemporal domain than to, for example, synthesize realistic images of traffic.

According to a fourth aspect, a vehicle comprises the computing device according to the third aspect.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
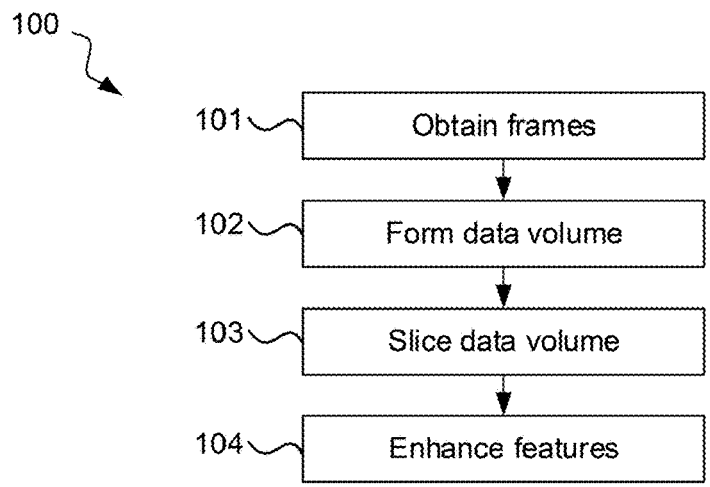
FIG. 1 illustrates a flowchart representation of a method according to an embodiment.

FIG. 1 illustrates a flow chart representation of a method 100 according to an embodiment.

According to an embodiment, the method 100 comprises obtaining 101 a plurality of frames corresponding to a video, wherein the plurality of frames comprises features of interest.

The plurality of frames may comprise, for example, a plurality of greyscale images. Each pixel of a greyscale image may correspond to a numerical value, wherein the numerical value represents color of that pixel on a scale between white and black. The features of interest may correspond to more lightly colored areas of such greyscale images. The features of interest may be obtained by performing, for example, feature extraction on images obtained from a camera. Alternatively, the plurality of frames may comprise the images obtained from the camera without separate feature extraction. Such an image may comprise color information, for example in the form of RGB values, instead of a greyscale information.

Each frame in the plurality of frames may correspond to a different instant of time. The plurality of frames may correspond to, for example, consecutive frames in the video.

The method 100 may further comprise forming 102, based on the plurality of frames, a spatiotemporal data volume, wherein two dimensions of the spatiotemporal data volume correspond to spatial dimensions of the plurality of frames and one dimension of the spatiotemporal data volume corresponds to a temporal dimension of the plurality of frames.

The spatiotemporal data volume may be formed by, for example, stacking the plurality of frames in the temporal dimension.

Two dimensions of the spatiotemporal data volume may correspond to spatial dimensions of the video and one dimension of the spatiotemporal data volume corresponds to a temporal dimension of the video.

The spatiotemporal data volume may also be referred to as a video volume, a video data volume, or similar.

The method 100 may further comprise slicing 103 the spatiotemporal data volume along a plurality of surfaces, producing a plurality of spatiotemporal images. Each spatiotemporal image in the plurality of spatiotemporal images may correspond to the spatiotemporal data volume along a corresponding surface in the plurality of surfaces.

According to an embodiment, each surface in the plurality of surfaces is curved. Thus, either or both of the spatial positions of such a surface may change as a function of the temporal dimension. Thus, at least one of the spatial positions of such a surface may be non-constant with respect to the temporal dimension. A curved surface may have non-zero curvature.

The spatiotemporal images may also be referred to as time slice (TS) images, generalized time slice (GTS) images, or similar.

Since each spatiotemporal image in the plurality of spatiotemporal images may correspond to the spatiotemporal data volume along a corresponding surface in the plurality of surfaces, each spatiotemporal image may comprise values, such as greyscale values or RGB values, of the spatiotemporal data volume along the corresponding surface.

The method 100 may further comprise enhancing 104 the features of interest in the plurality of spatiotemporal images using a neural network, producing a processed plurality of spatiotemporal images.

The enhancing may, for example, remove noise from the plurality of spatiotemporal images and/or connect disconnected parts of the features of interest.

At least some operations of the method 100 may be performed by a computer program when executed on a computer.

Figure 2:
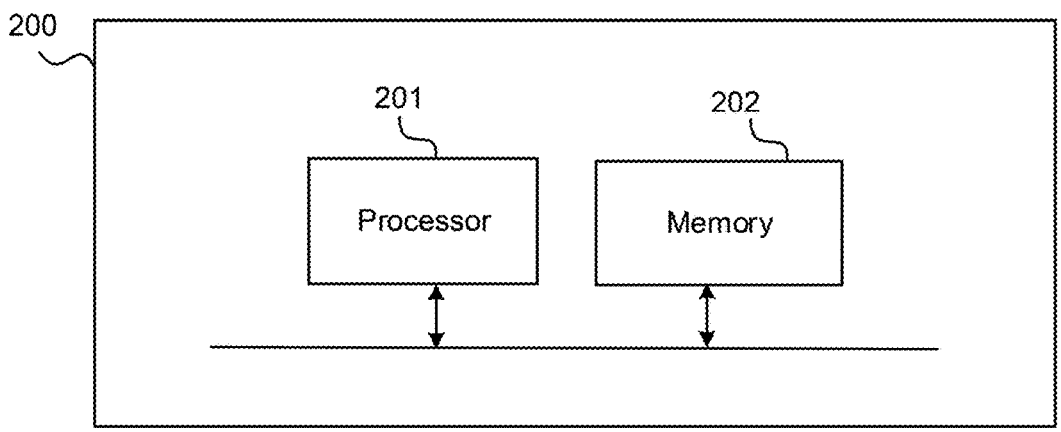
FIG. 2 illustrates a schematic representation of a computing device according to an embodiment.

FIG. 2 illustrates a schematic representation of a computing device 200 according to an embodiment.

According to an embodiment, the computing device 200 is configured to obtain a plurality of frames corresponding to a video, wherein the plurality of frames comprises features of interest.

The computing device 200 may be further configured to form, based on the plurality of frames, a spatiotemporal data volume, wherein two dimensions of the spatiotemporal data volume correspond to spatial dimensions of the plurality of frames and one dimension of the spatiotemporal data volume corresponds to a temporal dimension of the plurality of frames.

The computing device 200 may be further configured to slice the spatiotemporal data volume along a plurality of surfaces, producing a plurality of spatiotemporal images. Each spatiotemporal image in the plurality of spatiotemporal images may correspond to the spatiotemporal data volume along a corresponding surface in the plurality of surfaces.

The computing device 200 may be further configured to enhance the features of interest in the plurality of spatiotemporal images using a neural network, producing a processed plurality of spatiotemporal images.

The computing device 200 may comprise a processor 201. The computing device 200 may further comprise a memory 202.

In some embodiments at least some parts of the computing device 200 may be implemented as a system on a chip (SoC). For example, the processor 201, the memory 202, and/or other components of computing device 200 may be implemented using a field-programmable gate array (FPGA).

Components of the computing device 200, such as the processor 201 and the memory 202, may not be discrete components. For example, if the computing device 200 is implemented using a SoC, the components may correspond to different units of the SoC.

The processor 201 may comprise, for example, one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 202 may be configured to store, for example, computer programs and the like. The memory 202 may include one or more volatile memory devices, one or more non-volatile memory devices, and/or a combination of one or more volatile memory devices and non-volatile memory devices. For example, the memory 202 may be embodied as magnetic storage devices (such as hard disk drives, floppy disks, magnetic tapes, etc.), optical magnetic storage devices, and semi-conductor memories (such as mask ROM, PROM (programmable ROM), EPROM (erasable PROM), flash ROM, RAM (random access memory), etc.).

Functionality described herein may be implemented via the various components of the computing device 200. For example, the memory 202 may comprise program code for performing any functionality disclosed herein, and the processor 201 may be configured to perform the functionality according to the program code comprised in the memory 202.

When the computing device 200 is configured to implement some functionality, some component and/or components of the computing device 200, such as the one or more processors 201 and/or the memory 202, may be configured to implement this functionality. Furthermore, when the one or more processors 201 is configured to implement some functionality, this functionality may be implemented using program code comprised, for example, in the memory 202. For example, if the computing device 200 is configured to perform an operation, the one or more memories 202 and the computer program code can be configured to, with the one or more processors 201, cause the computing device 200 to perform that operation.

According to an embodiment, a vehicle comprises the computing device 200. For example, the computing device 200 may perform smart driving assistance system tasks in the vehicle. The vehicle may comprise, for example, one or more cameras, and the computing device 200 may obtain the video from the one or more cameras. In another embodiment, the functionality of the computing device 200 may be implemented as offline processing. Thus, the computing device 200 may not be connected to the vehicle.

Figure 3:
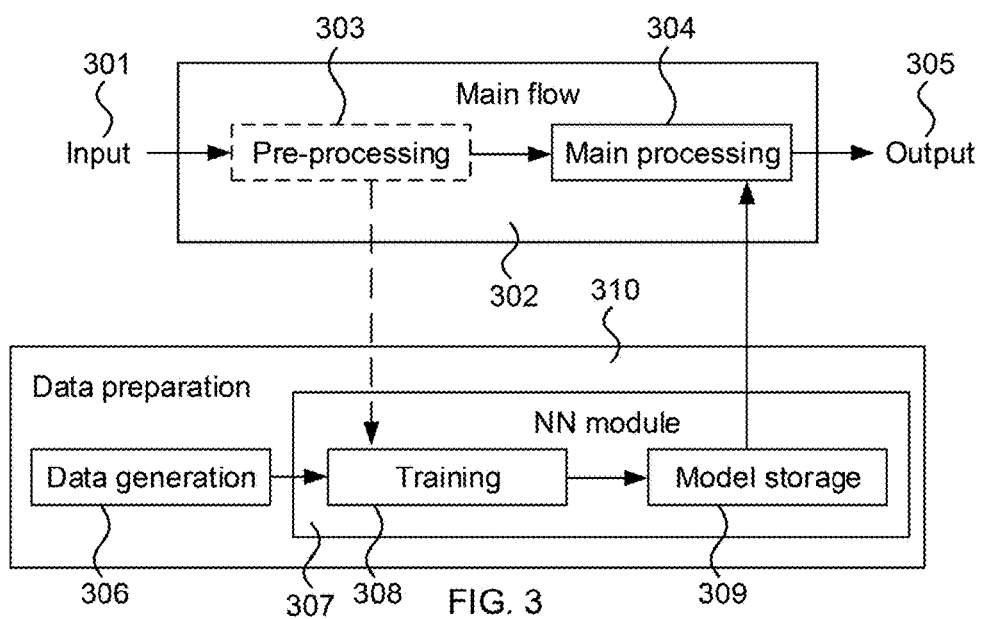
FIG. 3 illustrates a schematic representation of data flow according to an embodiment.

FIG. 3 illustrates a schematic representation of data flow according to an embodiment.

The method 100 may further comprise obtaining a plurality of input frames corresponding to the video and performing feature extraction on the plurality of input frames, producing the plurality of frames and the features of interest in the plurality of frames. The plurality of input frames may be obtained, for example, from a camera.

For example, in the embodiment of FIG. 3, a plurality of input frames 301 may be fed into a pre-processing module 303. The plurality of input frames 301 may correspond to, for example, images obtained from a camera or cameras of a vehicle.

The pre-processing module 303 may perform pre-processing on the plurality of input frames 301 producing the plurality of frames.

The pre-processing module 303 may be optional. Thus, in some embodiments, the plurality of frames may comprise the plurality of input frames 301.

The plurality of frames may be fed into a main processing module 304. The main processing module 304 may produce an output 305. The output 305 may comprise the processed plurality of spatiotemporal images.

The pre-processing module 303 and the main processing module 304 may be referred to as main data flow 302. The main data flow 302 may be performed by, for example, the computing device 200. The computing device 200 may be embodied in a vehicle, and the computing device 200 may perform the main data flow 302 while the vehicle is operated in traffic.

In a data preparation module 310, training data can be generated by a data generation module 306. The generated training data can be used for neural network training 308 in a neural network module 307. Optionally, additional training data, such as training data corresponding to real images, can also be obtained from the pre-processing module 303. The trained neural network can be stored into a model storage 309. The trained neural network model can then be, for example, deployed to vehicles for driving assistance applications.

The data preparation module 310 may be implemented by the computing device 200 or by any other computing apparatus. The functionality of the data preparation module 310 may be performed, for example, before the computing device 200 is used in traffic. The trained neural network from the model storage 309 may be used for the main data flow 302 in driving assistance applications.

Figure 4:
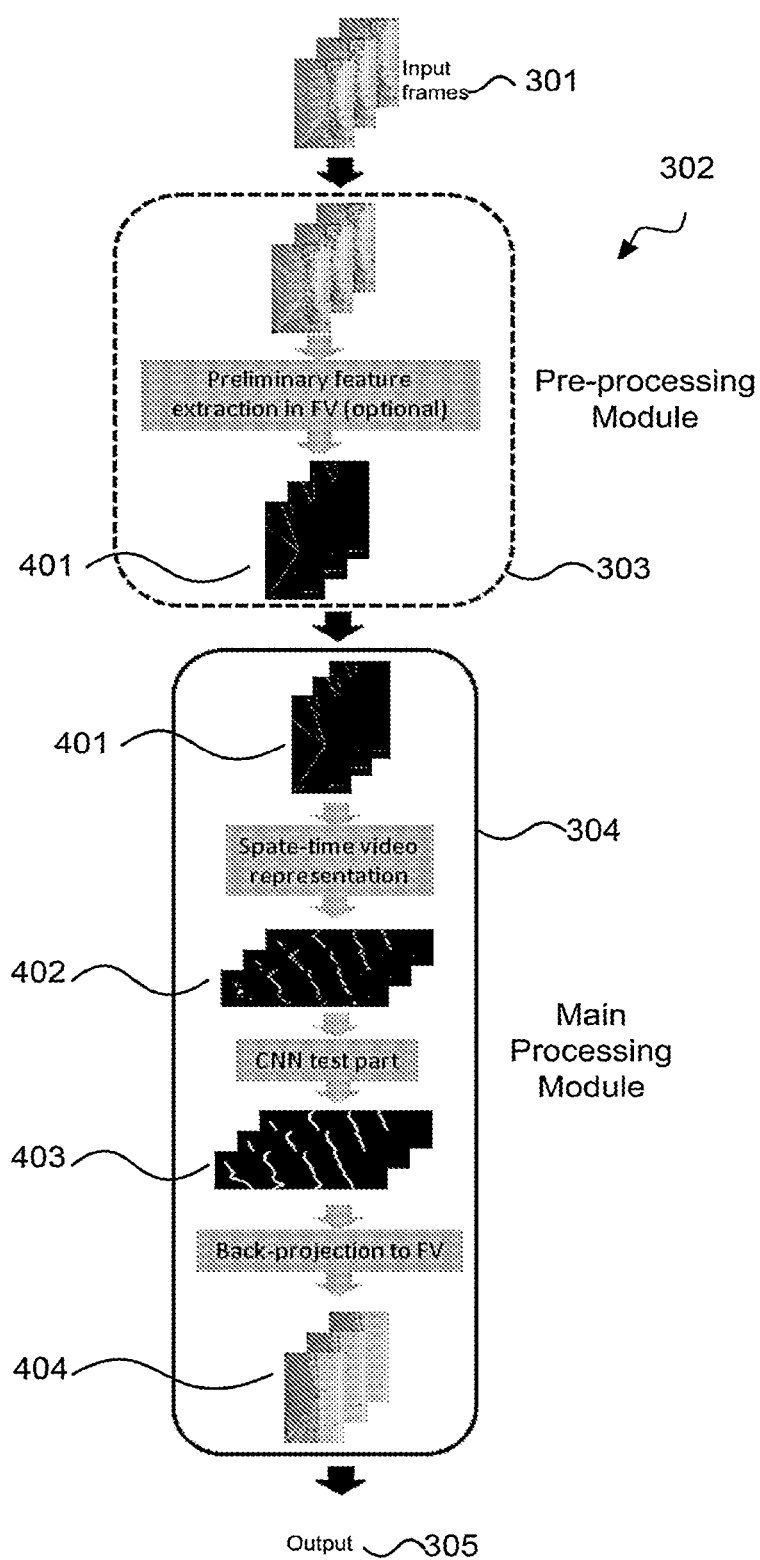
FIG. 4 illustrates a schematic representation of main data flow according to an embodiment.

FIG. 4 illustrates a schematic representation of the main data flow 302 according to an embodiment.

The pre-processing module 303 may perform pre-processing on the plurality of input frames 301 producing the plurality of frames 401. The input frames 310 may correspond to a video of, for example, a frontal view (FV) or any other view of a vehicle. The pre-processing 303 may extract relevant data and obtain images with initial detections of objects of interest. In the case of a lane detection system, for example, the pre-processing module 303 may use a lane detector to obtain greyscale images with brighter pixels denoting higher probability for the pixel to belong to a road lane marking.

In the main processing module 304, the plurality of frames 401 obtained from the pre-processing module 303 can be combined into the spatiotemporal data volume.

In the main processing module 304, the spatiotemporal data volume may be sliced along a plurality of surfaces, producing a plurality of spatiotemporal images 402. Each spatiotemporal image in the plurality of spatiotemporal images 402 may correspond to the spatiotemporal data volume along a corresponding surface in the plurality of curved surfaces.

The features of interest in the plurality of spatiotemporal images 402 can be enhanced using a neural network. This may produce a processed plurality of spatiotemporal images 403.

According to an embodiment, the enhancing 104 of the features of interest in the plurality of spatiotemporal images 402 comprises removing noise from the plurality of spatiotemporal images 402.

Alternatively or additionally, the enhancing 104 of the features of interest in the plurality of spatiotemporal images 402 may comprise connecting disconnected parts of at least one geometrical shape in the plurality of spatiotemporal images 402.

Alternatively or additionally, the enhancing 104 of the features of interest in the plurality of spatiotemporal images 402 may comprise extracting at least one geometrical shape in the plurality of spatiotemporal images 402.

Alternatively or additionally, the enhancing 104 of the features of interest in the plurality of spatiotemporal images 402 may comprise classifying at least one geometrical shape in the plurality of spatiotemporal images 402.

The at least one geometrical shape may correspond to a feature of interest in the features of interest. For example, lines/curves in the plurality of spatiotemporal images 402 may correspond to lane markings. Other geometrical shapes may correspond to, for example, objects to be tracked, such as cars, pedestrians, or bicycles, or sections to be segments, such as the road or the sky.

The enhanced features of interest in the processed plurality of spatiotemporal images 403 can be projected back onto the plurality of input frames 301, producing a plurality of output frames 404. For example, if the features of interest correspond to lane markings in traffic, the enhanced lane markings can be projected onto plurality of input frames 301 so that the lane markings in the plurality of input frames 301 are highlighted. The plurality of output frames 404 can correspond to the output 305 of the main data flow 302.

According to an embodiment, the method 100 further comprises projecting the enhanced features of interest in the processed plurality of spatiotemporal images onto the plurality of input frames or onto the plurality of frames.

Figure 5:
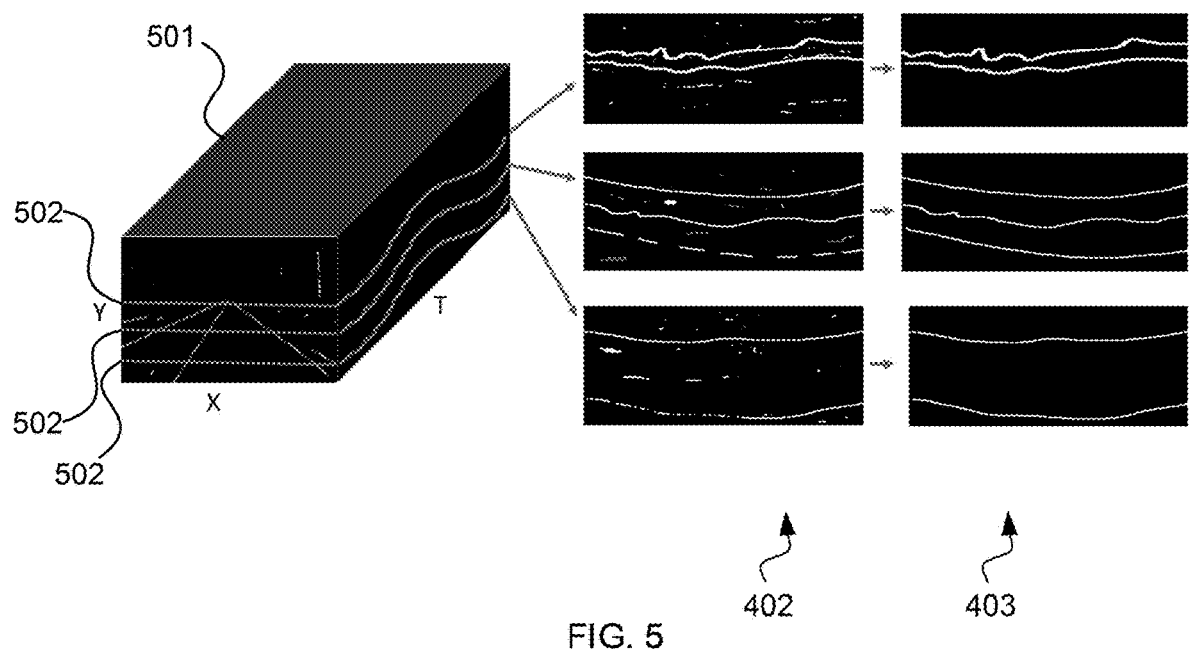
FIG. 5 illustrates a schematic representation of slicing of a spatiotemporal data volume according to an embodiment.

FIG. 5 illustrates a schematic representation of slicing of a spatiotemporal data volume 501 according to an embodiment.

In the embodiment of FIG. 5, three curved surfaces 502, along which the spatiotemporal data volume 501 is sliced, are illustrated. In the embodiment of FIG. 5, the y-position of the curved surfaces 502 changes as a function of the temporal dimension while the x-position remains original. Thus, when the spatiotemporal data volume 501 is sliced along the curved surfaces 502, a row of pixels from each frame in the plurality of frames 401 is copied to the corresponding spatiotemporal image. Since the y-position of the curved surfaces 502 changes, the row of pixels may be different for different frames in the plurality of frames 401.

In other embodiments, the y-position of the surfaces 502 may be constant while the x-position varies as a function of the temporal dimension. In other embodiments, the x- and y-positions of the surfaces 502 may vary as a function of the temporal dimension. In other embodiments, the x- and y-positions of the surfaces 502 may be constant as a function of the temporal dimension.

The shape of the surfaces 502 may be adjusted according to the application, object to be tracked, and other available information.

The spatiotemporal images 402 comprise space-time slices of the spatiotemporal data volume 501. Thus, the spatiotemporal images 402 comprise two-dimensional images with spatial and time dimensions combined. The embodiment of FIG. 5 illustrates three examples of such slices extracted from a spatiotemporal data volume 501 corresponding to a video that has been pre-processed by a lane detector.

The plurality spatiotemporal images 402 can be processed by a neural network. The processing may comprise, for example, cleaning and data extraction. In the case of lane detection, the neural network may take as an input noisy grey-scale spatiotemporal images 402 with curves that may have missing sections. The neural network can then output the processed plurality of spatiotemporal images 403 with cleaned connected lines. In the embodiment of FIG. 5, examples of spatiotemporal images 402 before enhancement by a neural network and processed spatiotemporal images 403 after enhancement by a neural network are illustrated. The processed plurality of spatiotemporal images 403 can then be combined into the spatiotemporal volume of the original structure.

By taking a slice from the spatiotemporal data volume 501, information from many frames in the plurality of frames can be combined into a single spatiotemporal image 402. Thus, the broader temporal context of the scene can be utilized in a single shot.

Further, by using slices from the spatiotemporal data volume 501, the effects of occlusions can be reduced. If an object is occluded in one frame and is visible again in another frame, the object can have a footprint in the spatiotemporal images 402 and the effect of the occlusion can be reduced by the neural network. Thus, the method 100 and/or the computing device 200 can be robust against occlusions. Further, this robustness can be fine-tuned to deal with occlusions of different types and temporal lengths.

Figure 6:
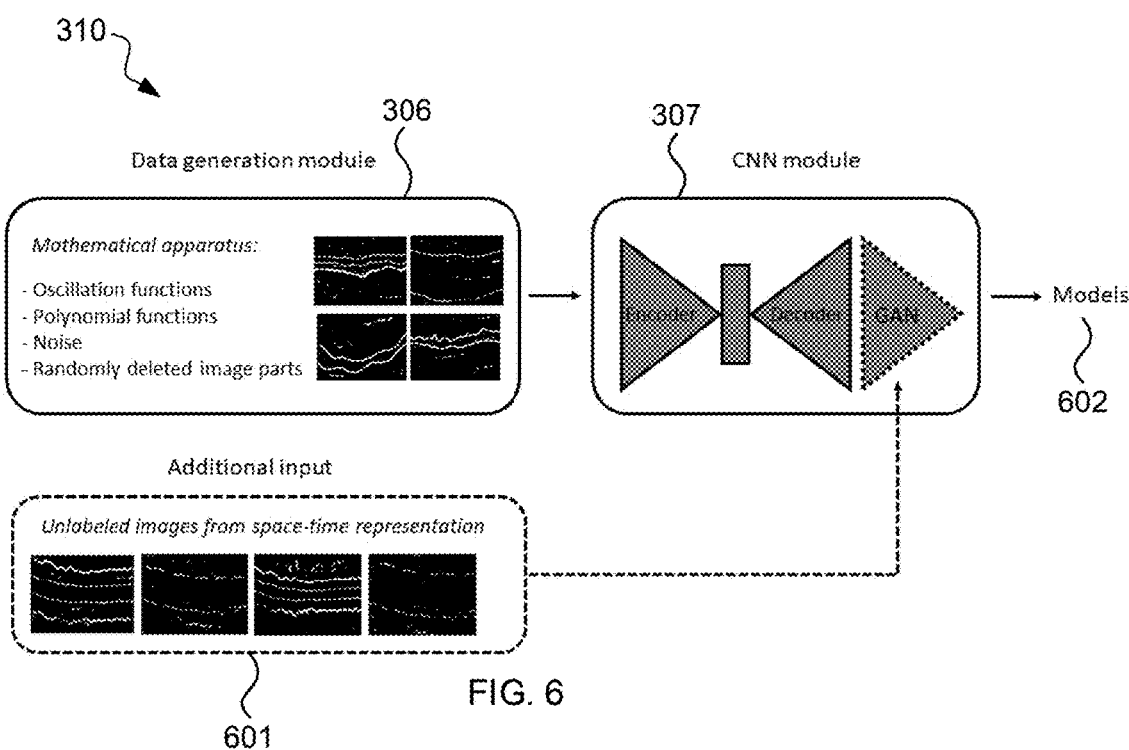
FIG. 6 illustrates a schematic representation of a data preparation module according to an embodiment.

FIG. 6 illustrates a schematic representation of the data preparation module 310 according to an embodiment.

Synthesized spatiotemporal images can be sent from the data generator module 306 to the neural network training module 307. In the neural network training module 307, a neural network, such as a convolutional neural network, can be trained to enhance the spatiotemporal images 402.

According to an embodiment, the neural network 602 comprises a convolutional neural network (CNN). Alternatively, the neural network may comprise any other type of neural network.

As an example, a CNN may be implemented as an hour-glass network, an encoder followed by a decoder, with optional Generative Adversarial Network (GAN) component. The GAN component may be used to better approximate synthesized data by real images 601. The output from the neural network training module 307 is a trained neural network 602. The neural network 602 may also be referred to as a model, a neural network model, or similar. The trained neural network 602 can be used in the main processing module 304.

The neural network 602 can accept as input a noisy grey-scaled images and learns enhance the image by, for example, linking disconnected lines and removing noise. If synthesized images do not fully mimic the real input and a certain number of real images are available, then the GAN component may be used for better learning.

One drawback of neural networks may be the need for a large annotated dataset. To overcome this obstacle, the neural network 602 can be configured to process spatiotemporal images. Thus, instead of using training data from the real world, training data can be synthesized directly in the spatiotemporal domain. This removes the need to synthesize realistic-looking traffic images for training, which could require large amounts of computational resources. With the use of non-natural images in the spatiotemporal domain, any type of behavior can be modelled mathematically (and if needed, fine-tuned by adversarial network part). For example, occlusions can be modelled by removing random patches from the spatiotemporal images in the training data. Similarly, false and miss detections can be modelled by adding noise of different types to the spatiotemporal training images.

The dataset used for the network training may be fully synthesized by a mixture of mathematical functions, for example polynomial and/or oscillating functions.

The training data may consist of, for example, non-realistic grey-scaled images in the spatiotemporal domain which can be easier for a neural network 602 to analyze. Thus it may be possible to use a simpler and shallower network structure without affecting performance, thus saving computational resources.

According to an embodiment, the neural network 602 is configured to be trained using synthesized spatiotemporal images comprising synthesized features of interest.

The method 100 and the computing device 200 can be used for a variety of labelling and tracking tasks and may not require human-system interaction like initial detections or manual dataset labelling.

The method 100 and the computing device 200 may not need to assume any additional knowledge, such as camera calibration or odometry information, about the plurality of frames 401. Further, there may be no need to make assumptions about the number of objects to be detected/tracked or about their properties, such as the number of lanes or their shape in the case of lane detector.

Since the neural network 602 can be trained in the spatiotemporal domain, the resulting neural network model can be slim and efficient. Thus, large amounts of data can be processed in a short time.

The method 100 and the computing device 200 may have a constant processing time that does not depend on the video length. By using the spatiotemporal images 402, the method 100 and the computing device 200 can consider the wider temporal context at once, thus the video time-length corresponds to the spatiotemporal image height. Therefore, the difference between a long video and a short video is the spatiotemporal image size which may not greatly affect the computational performance.

The method 100 and the computing device 200 may be implemented with reduced costs. The method 100 and the computing device 200 may be capable of automatic and human unsupervised data extraction from video sequences. Further, the neural network 602 may be trained in an unsupervised manner.

Figure 7:
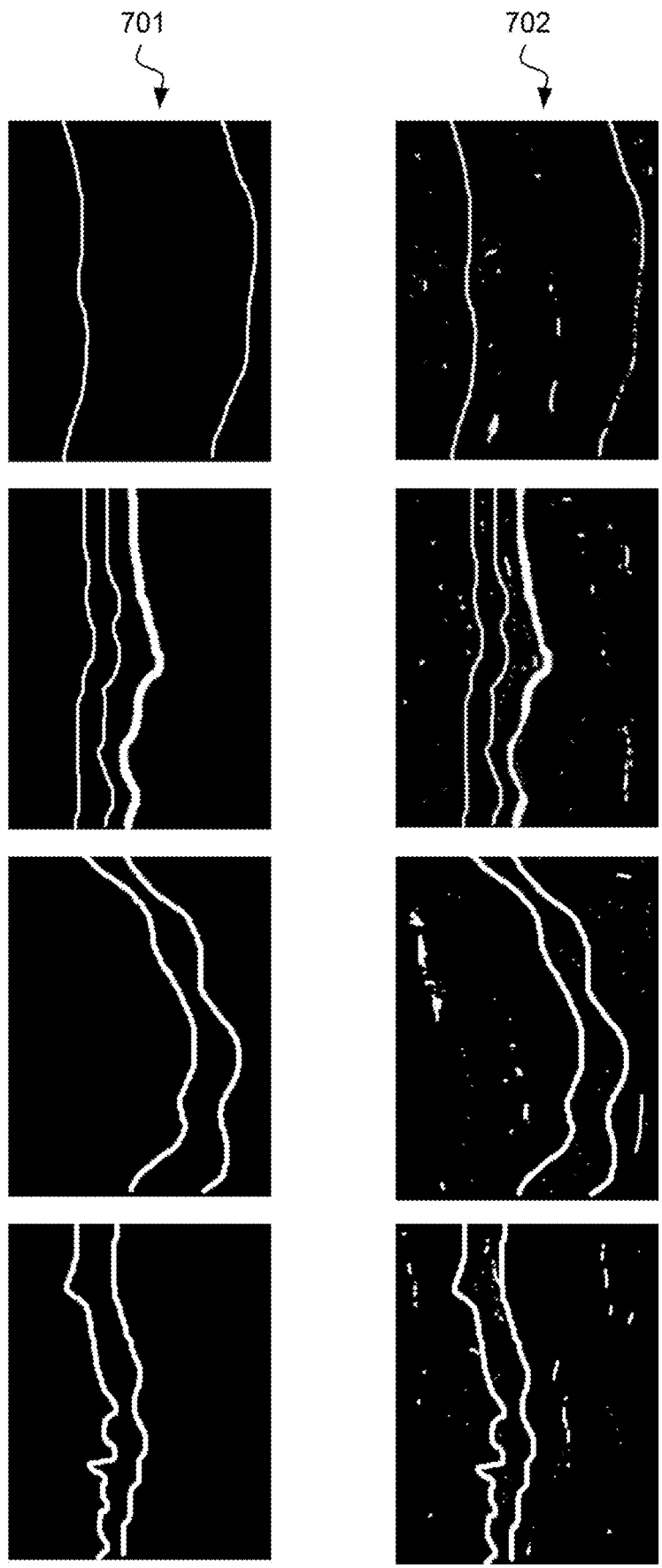
FIG. 7 illustrates a schematic representation of neural network training data according to an embodiment.

FIG. 7 illustrates a schematic representation of neural network training data according to an embodiment.

In the embodiment of FIG. 7, ground truth spatiotemporal images 701 and corresponding spatiotemporal images 702 are illustrated. As can be seen from FIG. 7, noise has been added to the ground truth images 701 and some sections of the features of interest have been disconnected to obtain the spatiotemporal images 702.

The neural network 602 can be trained to output a processed spatiotemporal images similar to the corresponding ground truth spatiotemporal image 701 when a spatiotemporal image 702 is fed into the neural network 602.

The ground truth spatiotemporal images 701 can be generated via mathematical simulation with different statistical parameters that mimic real spatiotemporal images. The ground truth spatiotemporal images 701 can be generated by, for example, combining various sinusoidal and polynomial functions. Then, noise of different types can be added to mimic, for example, detection noise. Further, random extra lines can be added, and random patches can be erased from the ground truth images 701 to obtain realistic spatiotemporal images 702 for the training.

During training of the neural network 602, parameters of the neural network 602 can be adjusted so that when a spatiotemporal image 702 in the training dataset is fed into the neural network 602, the neural network 602 outputs a processed spatiotemporal image that resembles the corresponding ground truth spatiotemporal image 701. The adjustment may be repeated in an iterative manner until, for example, a preconfigured condition is met. The preconfigured condition may comprise, for example, comparing the output of the neural network 602 to the ground truth, and the preconfigured condition is met when a parameter quantifying the difference between the output and the ground truth 701 is below a preconfigured threshold.

Figure 8:
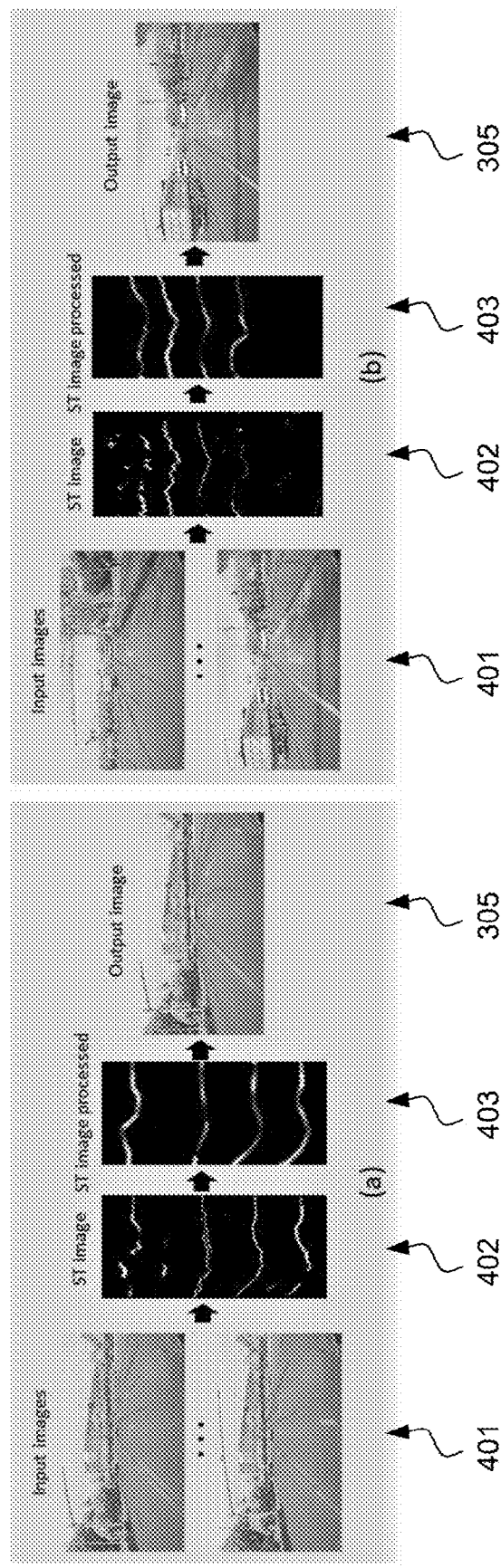
FIG. 8 illustrates a schematic representation of lane detection according to an embodiment.

FIG. 8 illustrates a schematic representation of lane detection according to an embodiment.

The localization of road lane markings is a necessary component of, for example, autonomous navigation. Lanes should be detected accurately, they should not be confused with arrows and other road markings, and they should be predicted even if the line itself is not visible in the image.

The method 100 and/or the computing device 200 can be applied to lane detection. The plurality of frames 401 may comprise images obtained from a frontal camera of a vehicle with initial lane detections. The initial lane detections can be obtained, for example, by the pre-processing module 303. The slicing procedure of the spatiotemporal data volume 501 disclosed herein may be applied to the plurality of frames to obtain space-time representation. The spatiotemporal images 402 can be processed by a neural network, such as a CNN, to enhance the lane markings, producing the processed plurality of spatiotemporal images 403. The processed plurality of spatiotemporal images 403 can be projected back onto the plurality of frames 401, producing a plurality of output frames 305, wherein the lane markings are highlighted in the plurality of output frames 305.

In some embodiments, a post-processing algorithm can take as input one of the processed spatiotemporal images 403 and assigns a label-ID per lane marking. The labels can then be propagated to the rest of the spatiotemporal images so that the ID of each lane marking remains consistent over the spatiotemporal images.

The embodiment of FIG. 8 illustrates two examples of the performance of the method 100 and computing device 200. In subfigure (a) of FIG. 8, initial lane detections contain many errors. For example, road arrows are confused with actual lane markings. Then spatiotemporal images 402 can be enhanced by a CNN, producing processed spatiotemporal images 403. As can be seen from FIG. 8, the features of interest, i.e. the lines corresponding to the lane markings, are enhanced. Disconnected parts of the features of interest are reconnected and noise is removed. The final correct lane detection results are illustrated in the output frames 305.

Subfigure (b) of FIG. 8 illustrates another example where the lane markings are occluded by a truck and are therefore missed. After the enhancement by the neural network in the spatiotemporal domain, the lane markings are redetected even behind the truck.

Figure 9:
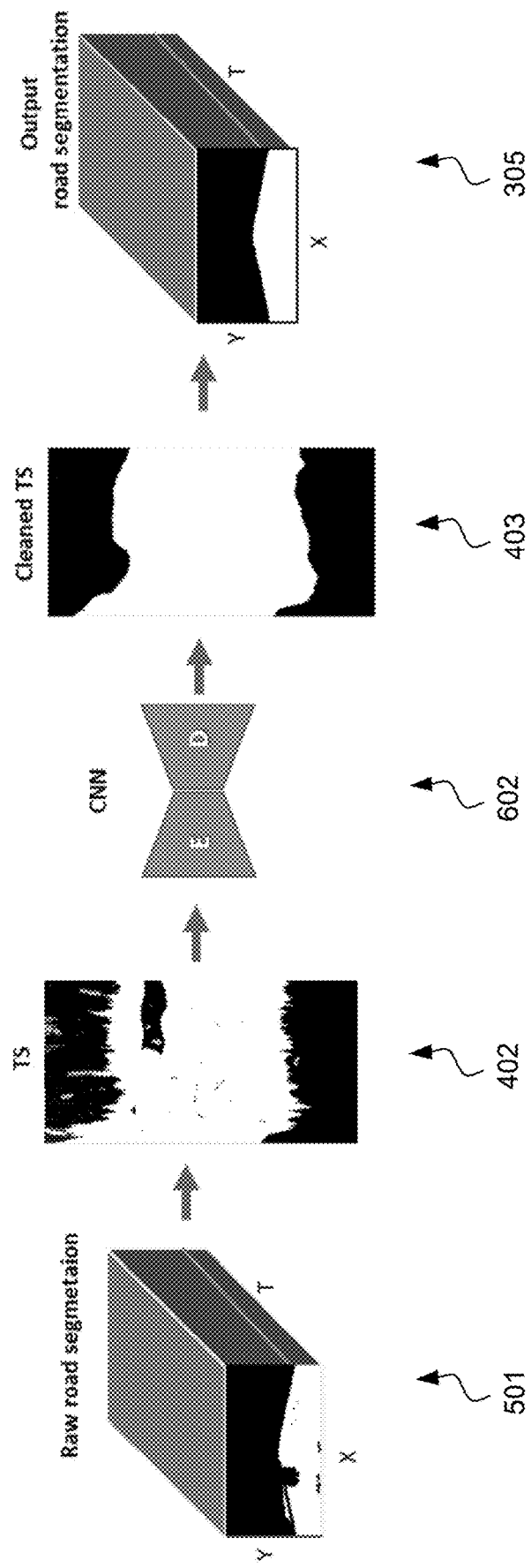
FIG. 9 illustrates a schematic representation of road segmentation according to an embodiment.

FIG. 9 illustrates a schematic representation of road segmentation according to an embodiment.

Road segmentation task is an important task in, for example, smart driving assistance systems. In such a task, the input may be an image or video of traffic and the output may be a binary classification of the image or video into road/non-road pixels. Per-pixel annotation can be a very time-consuming task that can take a few minutes per frame. The method 100 and the computing device 200 may be able to achieve time-consistent road segmentation masking with a reduced number of false positive and false negative detections.

A road segmentation algorithm can be applied to each input frame in the plurality of input frames 301 in pre-processing 303, producing the plurality of frames 401. The plurality of frames 401 can be formed into a spatiotemporal data volume 501 as disclosed herein. The spatiotemporal data volume 501 can be sliced into spatiotemporal images 402 as disclosed herein. The spatiotemporal images 402 can be fed into a neural network 602, such as a CNN, that can perform denoising to fill holes due to occluding obstacles on the road, clean small inaccuracies and correct the road boundaries. Similar to the lane-detection application, the neural network 602 can be trained with fully synthesized data that can be generated mathematically. The information from processed spatiotemporal images 403 can be projected back onto the plurality of input frames 301 to create a clean consistent output.

The road segmentation process can be performed automatically and may not require any human labelling of data. By leveraging the spatiotemporal domain, a clean output can be generated with reduced inaccuracies that may occur in, for example, single-frame analysis.

Figure 10:
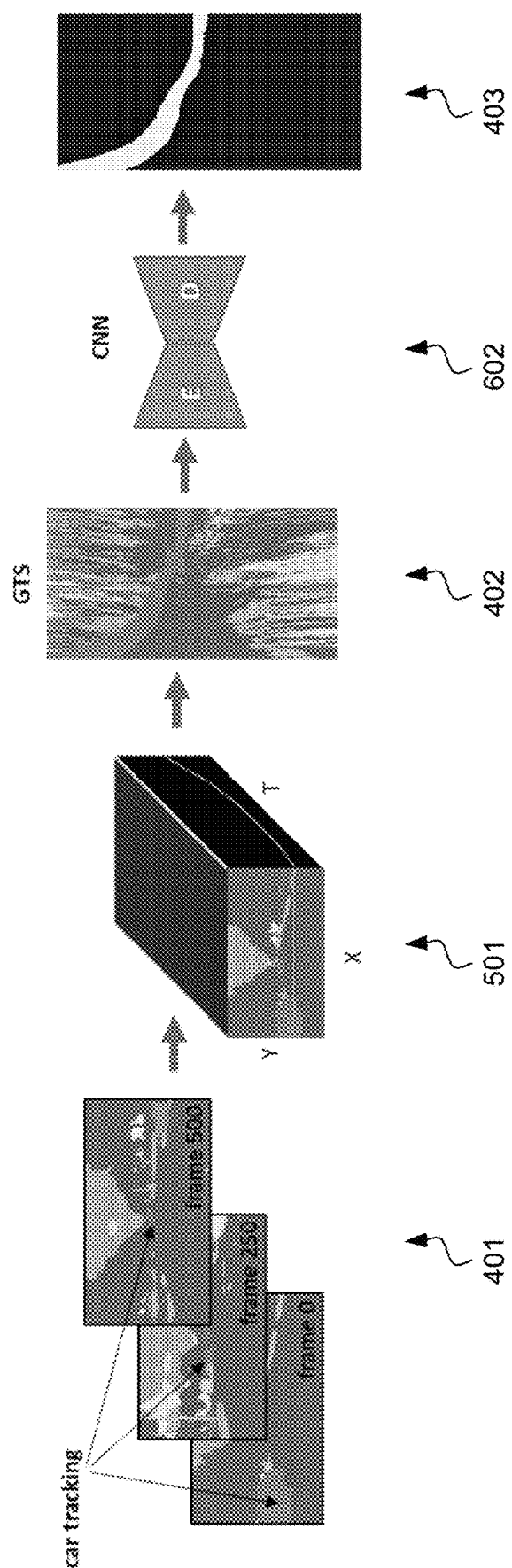
FIG. 10 illustrates a schematic representation of object tracking according to an embodiment.

FIG. 10 illustrates a schematic representation of object tracking according to an embodiment.

Object tracking is another possible application of the method 100 and/or of the computing device 200. For this task, a semantic segmentation neural network can be applied to every frame of a video sequence in, for example, the pre-processing, producing the plurality of frames 401. Such frame-by-frame prediction may be prone to errors and inaccuracies.

The spatiotemporal data volume 501 can be sliced as disclosed herein, producing the spatiotemporal images 402. The spatiotemporal images 402 can be fed into a neural network 602, such as a CNN, producing the processed spatiotemporal images 403. As can be seen from the embodiment of FIG. 10, the processed spatiotemporal images 403 comprise a clean "path" of the tracked object over time. The trajectory can be projected back to the image plane, obtaining a consistent tracklet of the object over time. This process can be applied to any semantic class that need to be tracked, such as a car, a bicycle, a pedestrian etc.

Although some of the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

The functionality described herein can be performed, at least in part, by one or more computer program components. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. The term 'and/or' may be used to indicate that one or more of the cases it connects may occur. Both, or more, connected cases may occur, or only either one of the connected cases may occur.

The operations of the methods described herein may be carried out in any suitable order, or simultaneously where appropriate. Additionally, individual blocks may be deleted from any of the methods without departing from the objective and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A method, comprising:
   obtaining a plurality of frames, corresponding to a video, comprising features of interest;
   forming, based on the plurality of frames comprising features of interest, a spatiotemporal data volume, wherein two dimensions of the spatiotemporal data volume correspond to spatial dimensions of the plurality of frames, and wherein one dimension of the spatiotemporal data volume corresponds to a temporal dimension of the plurality of frames;
   slicing the spatiotemporal data volume along a plurality of surfaces, producing a plurality of spatiotemporal images, wherein each spatiotemporal image in the plurality of spatiotemporal images corresponds to the spatiotemporal data volume along a corresponding surface in the plurality of surfaces;
   enhancing the features of interest, of the plurality of frames, in the plurality of spatiotemporal images using a neural network, thereby producing enhanced features of interest of a processed plurality of spatiotemporal images of the plurality of frames, wherein the features of interest comprise at least one geometric shape in the plurality of spatiotemporal images, and wherein the enhancing the features of interest in the plurality of spatiotemporal images to produce the enhanced features of interest comprises performing at least one operation taken from the group consisting of:
   connecting disconnected parts of the at least one geometrical shape in the plurality of spatiotemporal images;
   extracting the at least one geometrical shape in the plurality of spatiotemporal images; and
   classifying the at least one geometrical shape in the plurality of spatiotemporal images; and
   projecting the enhanced features of interest of the processed plurality of spatiotemporal images onto the plurality of frames.

2. The method according to claim 1, wherein the obtaining the plurality of frames that comprises features of interest comprises:
   obtaining a plurality of input frames corresponding to the video; and
   performing feature extraction on the plurality of input frames, thereby producing the plurality of frames and the features of interest in the plurality of frames.

3. The method according to claim 1, wherein the features of interest correspond to objects of interest in vehicle traffic.

4. The method according to claim 3, wherein the objects of interest in vehicle traffic comprise at least one object taken from the group consisting of:
   a lane marking;
   a segment of road; and
   an object in traffic to be tracked.

5. The method according to claim 1, wherein the neural network comprises a convolutional neural network.

6. The method according to claim 1, wherein the neural network is configured to be trained using synthesized spatiotemporal images comprising synthesized features of interest.

7. A non-transitory computer readable medium comprising program code configured to perform a method comprising:
   obtaining a plurality of frames, corresponding to a video, comprising features of interest;
   forming, based on the plurality of frames comprising features of interest, a spatiotemporal data volume, wherein two dimensions of the spatiotemporal data volume correspond to spatial dimensions of the plurality of frames, and wherein one dimension of the spatiotemporal data volume corresponds to a temporal dimension of the plurality of frames;
   slicing the spatiotemporal data volume along a plurality of surfaces, producing a plurality of spatiotemporal images, wherein each spatiotemporal image in the plurality of spatiotemporal images corresponds to the spatiotemporal data volume along a corresponding surface in the plurality of surfaces;
   enhancing the features of interest, of the plurality of frames, in the plurality of spatiotemporal images using a neural network, thereby producing enhanced features of interest of a processed plurality of spatiotemporal images of the plurality of frames, wherein the features of interest comprise at least one geometric shape in the plurality of spatiotemporal images, and wherein the enhancing the features of interest in the plurality of spatiotemporal images to produce the enhanced features of interest comprises performing at least one operation taken from the group consisting of:
   connecting disconnected parts of the at least one geometrical shape in the plurality of spatiotemporal images;
   extracting the at least one geometrical shape in the plurality of spatiotemporal images; and classifying the at least one geometrical shape in the plurality of spatiotemporal images; and projecting the enhanced features of interest of the processed plurality of spatiotemporal images onto the plurality of frames.

8. The non-transitory computer-readable medium according to claim 7, wherein the obtaining the plurality of frames that comprises features of interest comprises:
  obtaining a plurality of input frames corresponding to the video; and
  performing feature extraction on the plurality of input frames, thereby producing the plurality of frames and the features of interest in the plurality of frames.

9. The non-transitory computer-readable medium according to claim 7, wherein the features of interest correspond to objects of interest in vehicle traffic.

10. The non-transitory computer-readable medium according to claim 9, wherein the objects of interest in vehicle traffic comprise at least one object taken from the group consisting of:
  a lane marking;
  a segment of road; and
  an object in traffic to be tracked.

11. The non-transitory computer-readable medium according to claim 7, wherein the neural network comprises a convolutional neural network.

12. The non-transitory computer-readable medium according to claim 7, wherein the neural network is configured to be trained using synthesized spatiotemporal images comprising synthesized features of interest.

13. A computing device comprising:
  a processor; and
  a non-transitory computer-readable medium including computer-executable instructions that, when executed by the processor, facilitate carrying out a method comprising:
  obtaining a plurality of frames, corresponding to a video, comprising features of interest;
  forming, based on the plurality of frames comprising features of interest, a spatiotemporal data volume, wherein two dimensions of the spatiotemporal data volume correspond to spatial dimensions of the plurality of frames, and wherein one dimension of the spatiotemporal data volume corresponds to a temporal dimension of the plurality of frames;
  slicing the spatiotemporal data volume along a plurality of surfaces, producing a plurality of spatiotemporal images, wherein each spatiotemporal image in the plurality of spatiotemporal images corresponds to the spatiotemporal data volume along a corresponding surface in the plurality of surfaces;
  enhancing the features of interest, of the plurality of frames, in the plurality of spatiotemporal images using a neural network, thereby producing enhanced features of interest of a processed plurality of spatiotemporal images of the plurality of frames, wherein the features of interest comprise at least one geometric shape in the plurality of spatiotemporal images, and wherein the enhancing the features of interest in the plurality of spatiotemporal images to produce the enhanced features of interest comprises performing at least one operation taken from the group consisting of:
  connecting disconnected parts of the at least one geometrical shape in the plurality of spatiotemporal images;
  extracting the at least one geometrical shape in the plurality of spatiotemporal images; and
  classifying the at least one geometrical shape in the plurality of spatiotemporal images; and
  projecting the enhanced features of interest of the processed plurality of spatiotemporal images onto the plurality of frames.

14. The computing device according to claim 13, wherein the obtaining the plurality of frames that comprises features of interest comprises:
  obtaining a plurality of input frames corresponding to the video; and
  performing feature extraction on the plurality of input frames, thereby producing the plurality of frames and the features of interest in the plurality of frames.

15. The computing device according to claim 13, wherein the features of interest correspond to objects of interest in vehicle traffic.

16. The computing device according to claim 15, wherein the objects of interest in vehicle traffic comprise at least one object taken from the group consisting of:
  a lane marking;
  a segment of road; and
  an object in traffic to be tracked.

17. The computing device according to claim 13, wherein the neural network comprises a convolutional neural network.

18. The computing device according to claim 13, wherein the neural network is configured to be trained using synthesized spatiotemporal images comprising synthesized features of interest.

19. A vehicle comprising the computing device according to claim 13.

20. The vehicle according to claim 19, wherein the obtaining the plurality of frames that comprises features of interest comprises:
  obtaining a plurality of input frames corresponding to the video; and
  performing feature extraction on the plurality of input frames, thereby producing the plurality of frames and the features of interest in the plurality of frames.

* * * * *